US010046941B2

(12) United States Patent
Rich

(10) Patent No.: US 10,046,941 B2
(45) Date of Patent: Aug. 14, 2018

(54) CABLE SUPPORT STAND

(71) Applicant: Roy Rich, Morristown, TN (US)

(72) Inventor: Roy Rich, Morristown, TN (US)

( * ) Notice: Subject to any disclaimer, the term of this patent is extended or adjusted under 35 U.S.C. 154(b) by 105 days.

(21) Appl. No.: 15/074,016

(22) Filed: Mar. 18, 2016

(65) Prior Publication Data

US 2016/0200546 A1 Jul. 14, 2016

Related U.S. Application Data

(63) Continuation-in-part of application No. 14/444,500, filed on Jul. 28, 2014, now abandoned.

(60) Provisional application No. 61/858,696, filed on Jul. 26, 2013.

(51) Int. Cl.

| *B65H 57/14* | (2006.01) |
|---|---|
| *B65H 57/26* | (2006.01) |
| *F16M 11/32* | (2006.01) |
| *F16M 11/36* | (2006.01) |
| F16M 11/14 | (2006.01) |
| F16M 11/06 | (2006.01) |

(52) U.S. Cl.
CPC ............ *B65H 57/26* (2013.01); *B65H 57/14* (2013.01); *F16M 11/32* (2013.01); *F16M 11/36* (2013.01); *B65H 2701/34* (2013.01); *F16M 11/06* (2013.01); *F16M 11/14* (2013.01)

(58) Field of Classification Search
CPC .... B65H 57/26; B65H 57/14; B65H 2701/34; F16M 11/36; F16M 11/32; F16M 11/06; F16M 11/14
See application file for complete search history.

(56) References Cited

U.S. PATENT DOCUMENTS

| 1,048,779 | A |   | 12/1912 | Woodhead |   |
|---|---|---|---|---|---|
| 1,831,306 | A |   | 11/1931 | Kakimoto |   |
| 2,524,351 | A | * | 10/1950 | Jensen | ..................... B66D 1/04 |
|   |   |   |   |   | 242/395 |
| 2,555,790 | A | * | 6/1951 | Emery | ................... A01K 89/00 |
|   |   |   |   |   | 242/404.3 |
| 3,375,045 | A |   | 3/1968 | Zeidler |   |
| 3,788,575 | A |   | 1/1974 | Boettcher |   |

(Continued)

FOREIGN PATENT DOCUMENTS

GB 2450742 A 7/2009

*Primary Examiner* — William A. Rivera
(74) *Attorney, Agent, or Firm* — Pitts & Lake, P.C.

(57) ABSTRACT

A cable support system includes a frame, an axle disposed within the frame, and a drum or roller having a rim for receiving the axle such that the drum is supported by and rotates on the axle, wherein the drum is in rollable contact with the cable for supporting the cable and configured for cable to move across surface of the roller while the roller is rotating to facilitate paying out or taking up the cable as the roller rotates. A stand includes a top portion in contact or physical communication with the frame and a plurality of legs which extend downwardly from the top portion, elevating the frame to facilitate the pay out or taking up of the cable over objects below the frame. The system is capable of switching between at least two different states or modes of use: a first mode, in which the roller and frame are positioned above the top portion; and a second mode, in which the roller and frame are positioned below the top portion of the stand, generally hanging from or suspended from the top portion of the stand.

19 Claims, 7 Drawing Sheets

(56) References Cited

U.S. PATENT DOCUMENTS

| | | |
|---|---|---|
| 4,383,633 A | 5/1983 | Seragnoll |
| 4,452,386 A | 6/1984 | McElyea |
| 4,469,289 A | 9/1984 | Gebo |
| 4,714,380 A | 12/1987 | Coutarel |
| 5,593,107 A * | 1/1997 | Focke .................... B23Q 15/22 |
| | | 242/533 |
| 5,957,401 A * | 9/1999 | O'Donnell ........... B65H 75/406 |
| | | 191/12.4 |
| 5,992,827 A | 11/1999 | Kvalsund |
| 6,299,100 B1 | 10/2001 | Cloud |
| 6,398,148 B1 * | 6/2002 | Snow ..................... B65H 49/28 |
| | | 242/395.1 |
| 6,729,606 B1 | 5/2004 | Durin |
| 6,814,327 B1 | 11/2004 | Myer |
| 7,077,368 B1 | 7/2006 | Karoly |
| 7,306,101 B2 * | 12/2007 | Murry .................. B65H 75/025 |
| | | 206/408 |
| 7,658,345 B2 | 2/2010 | Wells et al. |
| 8,025,261 B2 | 9/2011 | Jordan et al. |
| 8,276,858 B1 | 10/2012 | Jordan et al. |
| 8,422,847 B2 | 4/2013 | Kowalczyk et al. |
| 2004/0232276 A1 | 11/2004 | Ferris |
| 2006/0086862 A1 | 4/2006 | Konkel et al. |
| 2007/0199769 A1 | 8/2007 | Chesness et al. |
| 2011/0315804 A1 | 12/2011 | Talgo et al. |

* cited by examiner

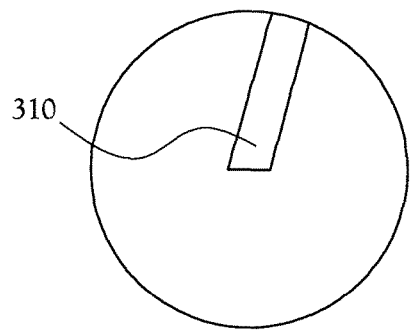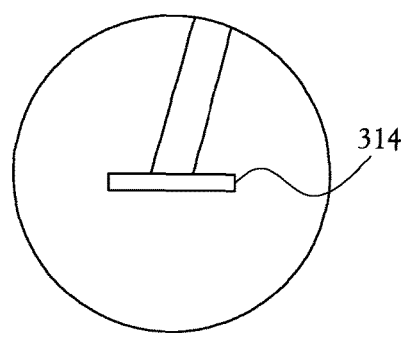
Fig.6A   Fig.6B
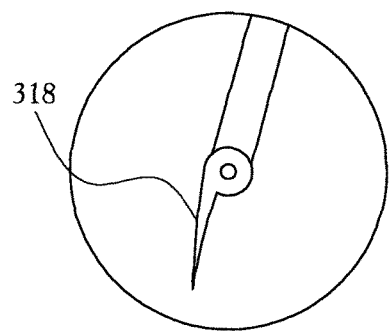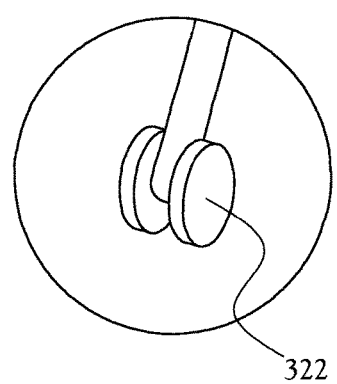
Fig.6C   Fig.6D

CABLE SUPPORT STAND

CROSS-REFERENCE TO RELATED APPLICATIONS

This Application is a continuation-in-part of U.S. patent application Ser. No. 14/444,500, filed Jul. 28, 2014, which claims the benefit of U.S. Provisional Patent Application Ser. No. 61/858,696, filed Jul. 26, 2013. The contents of both the foregoing applications are incorporated herein by reference in their entirety.

STATEMENT REGARDING FEDERALLY SPONSORED RESEARCH OR DEVELOPMENT

Not Applicable.

BACKGROUND OF THE INVENTION

1. Field of Invention

The present application relates generally to cable installation systems, and more particularly to a cable elevation support system.

2. Description of the Related Art

Large diameter electrical cable, wire rope and flexible tubing such as that used to distribute natural gas are usually supplied on large wooden spools or reels. Reels of this type have a cylindrical barrel for winding cable or the like, and a pair of disk-shaped flanges of larger diameter than the barrel at opposite ends of the barrel, for retaining material wound onto the barrel. The combined weight of a reel and the cable, tubing or the like wound onto the reel may exceed several hundred pounds. Accordingly, moving such reels between various locations at a job site can often be a cumbersome and laborious task. Moreover, paying cable or tubing off of a reel, or winding such material back onto a reel, are laborious tasks. One type of prior art device used for handling heavy cable reels includes a pair of laterally opposed parallel rails to receive the circular end plate flanges of the reel. Rollers mounted within the channels rotatably support the rims of the cable reel flanges, allowing the cable to rotate to permit paying out or taking up cable. Such devices provide no means for transporting cable reels.

A variety of other types of devices intended to facilitate the handling of reels or cylindrical objects are disclosed in the following U.S. patents:

Pelletier, U.S. Pat. No. 4,030,679 discloses an identical pair of support stands for lifting a roll of floor covering material from a position on a supporting surface to an elevated position in which the roll is free to rotate, allowing materials to be unrolled. The axle of a carpet roll is supported by upwardly opening yokes, attached to each support stand, which has a short horizontally disposed base leg and a longer vertical standard.

Gebo, U.S. Pat. No. 4,469,289 discloses a reel stand apparatus for rollably supporting a reel or spool of cable, the apparatus consisting of a pair of stanchions each having a base frame including a pair of short perpendicularly disposed horizontal frame members and a vertical post having a rollable reel axle support.

Setzke, U.S. Pat. No. 4,746,078 discloses a reel lifting and support device having a pair of identical units each comprising a lower elongated support arm which is initially disposed in a generally horizontal position, a short arm disposed obliquely upwardly from a distal end of the long arm, and a plurality of sockets disposed perpendicularly to the upper portion of the short arm, for receiving support axles for reels of different heights. Each unit also includes a brace unit or beam member pivotably connected to the short arm between the sockets, the brace unit being disposed obliquely downwards towards the long arm and being pivotably attached thereto. A short hollow cylindrical tube disposed transversely across the junction of the long arm and short arm serves as a fulcrum and pivot axis for the apparatus so that when the long arms are pivoted down from an upwardly angled position to a horizontal position, a reel on an axle supported by the sockets is pivoted upwards to a freely rotatable position above the ground, because short arm and the attached sockets are thereby pivoted to a higher altitude.

Arrington, U.S. Pat. No. 4,932,601 discloses a reel lift comprising a pair of identical stands, each having a short horizontally disposed angle iron base, a short angle iron upright member depending perpendicularly upwards from the base, a handle rod fastened to and extending parallel upwards from the upright member, and a reel axle support sleeve fastened transversely to one side of the upright member, near its upper end. The front edge of each angle iron base plate serves as a fulcrum or pivot edge when the apparatus with attached cable reel is pivoted from a position in which the handle are angled downwards from an upright vertical position, to a vertical position in which the cable reeling elevated above a support surface to permit its free rotation.

There are other support devices designed for spools or reels. Typical of these is U.S. Pat. No. 442,309 issued to Diamond et al. on Dec. 9, 1890. Another patent was issued to Topp on Jan. 1, 1924 as U.S. Pat. No. 1,479,209. Yet another U.S. Pat. No. 1,509,717 was issued to Davis on Sep. 23, 1924 and still yet another was issued on May 14, 1968 to Godson as U.S. Pat. No. 3,383,071. Another patent was issued to Peterson on Jan. 29, 1985 as U.S. Pat. No. 4,496,028. Yet another U.S. Pat. No. 4,752,047 was issued to Franks, Jr. on Jun. 21, 1988. Another was issued to Arrington on Jun. 12, 1990 as U.S. Pat. No. 4,932,601 and still yet another was issued on Dec. 2, 1997 to Holliday as U.S. Pat. No. 5,692,701. Another patent was issued to Honnecke, et al. on Jun. 20, 2000 as U.S. Pat. No. 6,076,780. Yet another U.S. Pat. No. 6,299,100 was issued to Cloud on Oct. 9, 2001. Another was issued to Standard Telefon Og Kabel-Fabric on Feb. 10, 1960 as United Kingdom No. GB827,826 and still yet another was issued on Aug. 12, 1964 to Clarke as United Kingdom Patent No. GB966,726.

Efforts regarding such systems have led to continuing developments to improve their functionality, versatility, practicality and efficiency.

BRIEF SUMMARY OF THE INVENTION

The object of the present invention is to avoid disadvantages of the prior art.

A cable support system includes a detachable frame, an axle disposed within the frame, and a drum or roller having a rim for receiving the axle such that the drum is supported by and rotates on the axle, wherein the drum is in rollable contact with the cable for supporting the cable and configured for cable to move across surface of the roller while the roller is rotating to facilitate paying out or taking up the cable as the roller rotates. A stand includes a top portion in contact or physical communication with the frame and a plurality of legs which extend downwardly from the top portion, elevating the frame to facilitate the pay out or taking up of the cable over objects below the frame. The system is capable of switching between at least two different states or modes of use: a first mode, in which the roller and frame are positioned above the top portion; and a second mode, in which the roller and frame are positioned below the top portion of the stand, generally hanging from or suspended from the top portion of the stand.

Thus, in some example embodiments according to the present general inventive concept, an apparatus for manipulating cable includes a frame having a first side and a second side; an axle disposed through the frame extending from the first side to the second side; a roller having a rim for receiving the axle such that the roller is supported by and rotates on the axle, wherein the roller is in rollable contact with the cable for supporting the cable and configured for cable to move across surface of the roller while the roller is rotating to facilitate movement of the cable as the roller rotates; and a stand having a stand plate in physical communication with the frame and a plurality of legs which extend downwardly from the stand plate, wherein the legs and stand plate elevate the frame to facilitate the movement of the cable over objects below the frame; wherein the frame is configured to rest atop said stand plate in a first state and is also configured to suspend from said stand plate in a second state.

Some embodiments further include a suspension assembly attached to said stand plate to suspend said frame from said stand plate.

In some embodiments, said suspension assembly includes a hook.

Some embodiments further include a rotation system configured to facilitate the frame to rotate about an axis approximately perpendicular to the axis of rotation of the roller.

In some embodiments, the rotation system comprises a pin and hole system.

In some embodiments of the present general inventive concept, a cable support system includes a frame having a first side and a second side; an axle disposed through the frame extending from the first side to the second side; a drum having a rim for receiving the axle such that the drum is supported by and rotates on the axle, said drum being in rollable contact with the cable to support the cable, said drum being configured for cable to move across surface of the drum while the drum is rotating to facilitate paying out or taking up the cable as the drum rotates; and a stand having a top portion proximate said frame and a plurality of legs which extend downwardly from the top portion, wherein the legs and top portion elevate the frame to facilitate the pay out or taking up of the cable over objects below the frame; wherein the frame is configured to be above said top portion in a first mode and is also configured to be below said top portion in a second mode.

Some embodiments further include a suspension assembly attached to said top portion to suspend said frame from said top portion when said frame is below said top portion in a second mode.

In some embodiments, said suspension assembly includes a hook.

Some embodiments further include a rotation system configured to facilitate the frame to rotate about an axis approximately perpendicular to the axis of rotation of the roller.

In some embodiments, the rotation system comprises a pin and hole system.

Some embodiments further include a tilt system configured to facilitate tilting of the frame to change the axis of rotation of the drum.

In some embodiments, the tilt system comprises a ball and socket system.

Some embodiments further include a rotation system configured to facilitate the frame to rotate about three axes.

In some embodiments, the rotation system comprises a ball and socket system.

In some embodiments, said drum has a first part that tapers to be flush with the first side and a first part that tapers to be flush with the second side.

BRIEF DESCRIPTION OF THE SEVERAL VIEWS OF THE DRAWINGS

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which:

FIGS. 6A-6D are magnified views of embodiments of support legs for a cable system according to the present general inventive concept.

DETAILED DESCRIPTION OF THE INVENTION

In some example embodiments of the present general inventive concept, as disclosed herein, a cable support system includes a detachable frame, an axle disposed within the frame, and a drum or roller (hereinafter generally "roller") having a rim for receiving the axle such that the drum is supported by and rotates on the axle, wherein the roller is in rollable contact with the cable for supporting the cable and configured for cable to move across surface of the roller while the roller is rotating to facilitate paying out or taking up the cable as the roller rotates. A stand includes a top portion in contact or physical communication with the frame and a plurality of legs which extend downwardly from the top portion, elevating the frame to facilitate the pay out or taking up of the cable over objects below the frame. The system is capable of switching between at least two different states or modes of use: a first mode, in which the roller and frame are positioned above the top portion; and a second mode, in which the roller and frame are positioned below the top portion of the stand, generally hanging from or suspended from the top portion of the stand.

Figure 1:
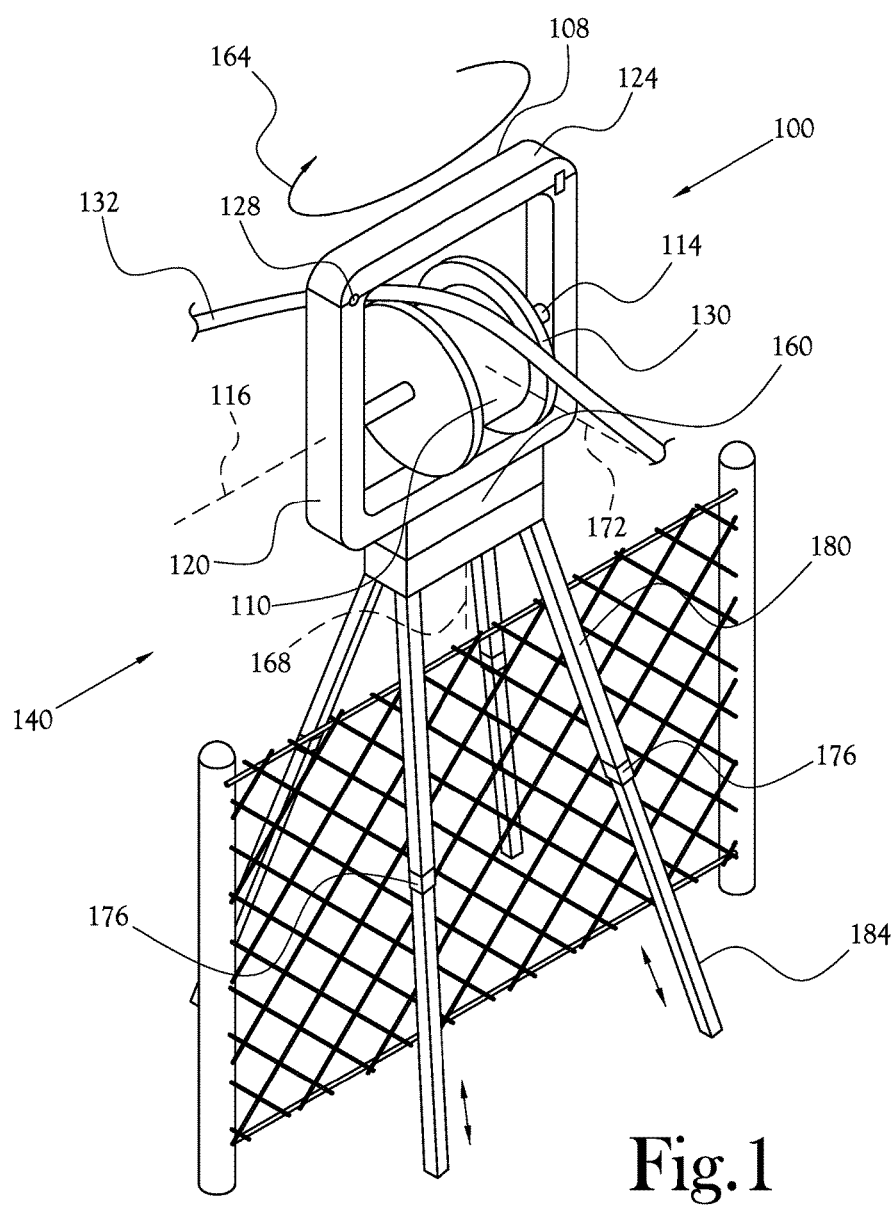
FIG. 1 is a perspective view of an example embodiment of a cable support system.
Figure 2:
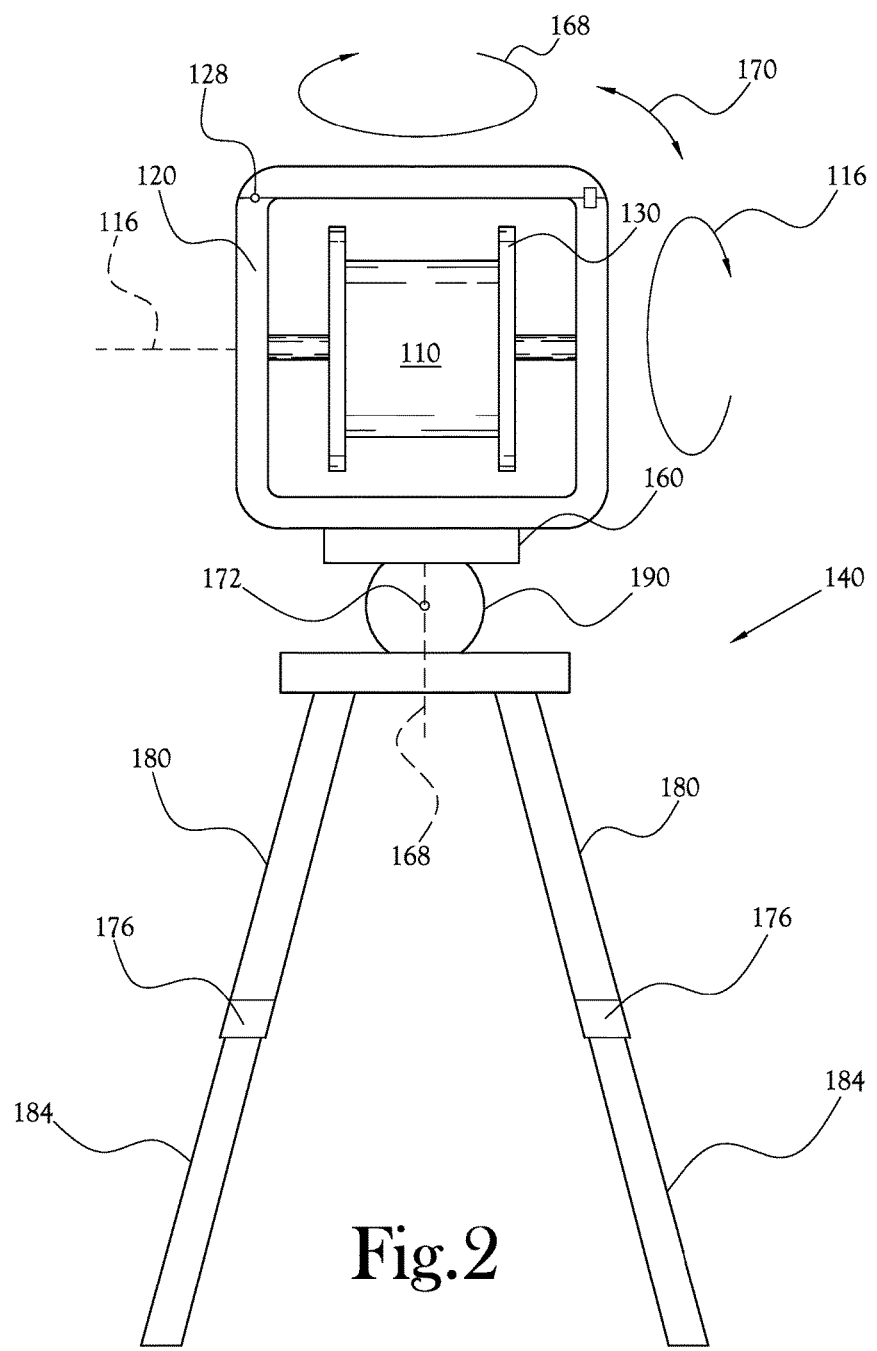
FIG. 2 is a front view of the example embodiment shown in FIG. 1.

Referring now to the Figures, FIG. 1 shows a plan view of one example embodiment cable support system 100 according to the present general inventive concept. The example cable support system 100 includes a roller box 108, which includes a roller 110 that has a substantially circular side view. The roller rotates or spins about an axle, axis or spindle 114 which may be a rod or tube type structure which extends through the center of the roller along an axis of rotation 116. The roller may be disposed in a containment box or frame 120. The roller and spindle are supported by the frame 120. The frame 120 may have a pivoting top 124, which may pivot about a joint, point or hinge 128. The hinge 128 permits the top of the frame 120 to open easily to permit cable or other flexible tubing, hosing or wire to be placed on top of and to rotate around the roller 110. A cable 132 is in rollable or rotational contact with the drum and can be pulled through the frame 120 via rotation of the roller 110. As cable is pulled through the frame 120, the cable weight and friction of the cable causes the roller 110 to rotate, thereby easing the force necessary to pull the cable.

The illustrated example embodiment cable support system further encompasses a stand 140 having a plurality (e.g. four) of legs attached to a swivel plate 160. The frame is connected to and supported by the swivel plate. The swivel plate may be configured to facilitate the frame to rotate or swivel (arrows 164) about an axis of rotation 168.

In some example embodiments, the swivel plate is configured to facilitate tilting (arrows 170) or rotation of the frame from side to side about an axis of rotation 172.

In some example embodiments, the frame and swivel plate are connected or joined utilizing a ball 190 and socket type arrangement. A ball and socket type arrangement may facilitate the frame to rotate about three axes.

In some example embodiments, the frame 120 and swivel plate 160 are connected or joined in a configuration that the support system for the drum and drum combination operate similar to the operation of a gyroscope with the drum at the center.

In some example embodiments, at least one leg may have a joint 176 that is configured to facilitate telescoping between an upper leg section 180 and a lower leg section 184. The lower leg section may slide into the upper leg section or vice-versa and the joint may have a locked and unlocked state to prevent or permit telescoping. In an example, the joint may be collar which twists to tighten and loosen the gripping force between leg sections.

Figure 3:
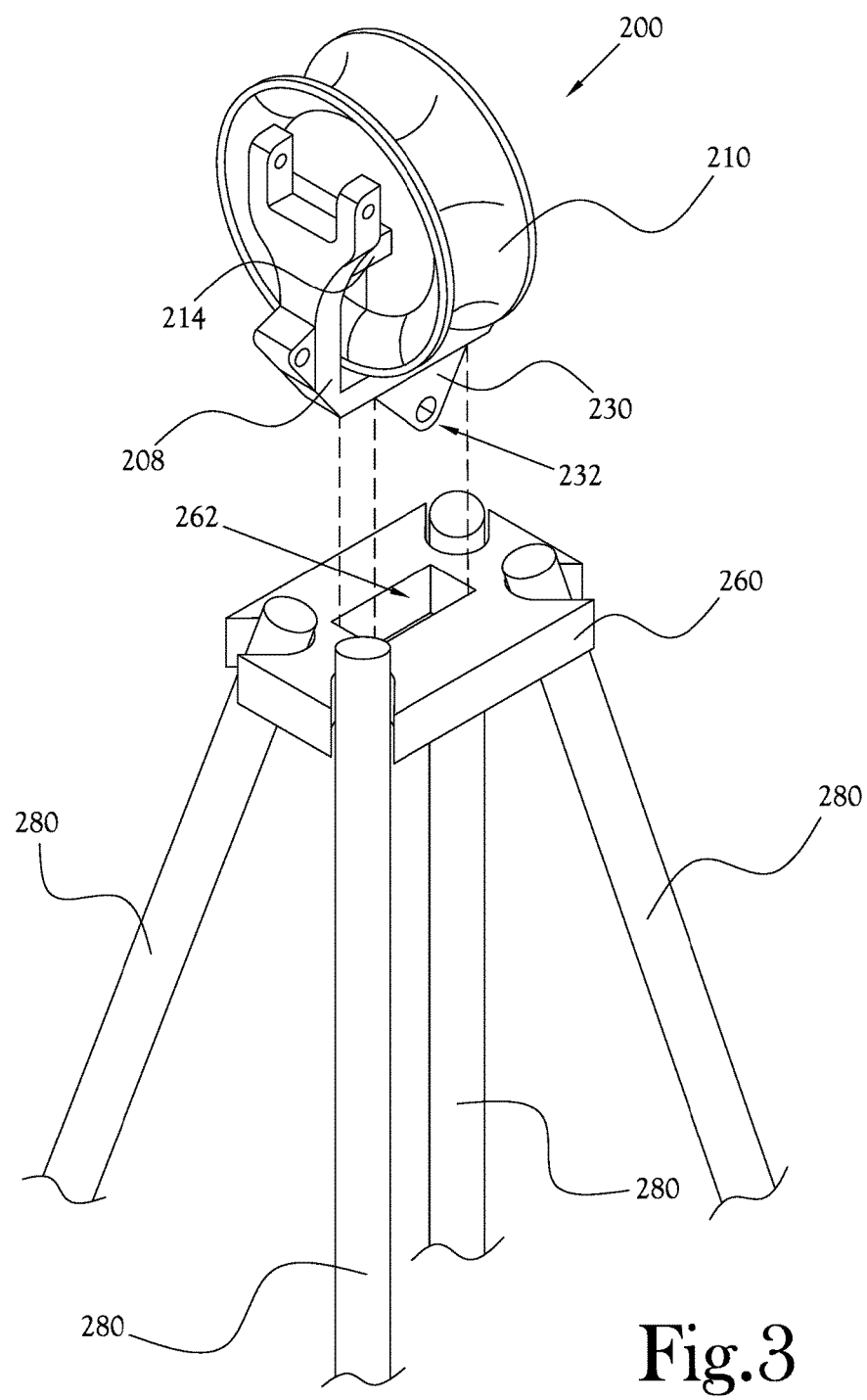
FIG. 3 is a perspective view of another example embodiment of a cable support system, with a detachable frame and roller positioned above the stand.
Figure 4A:
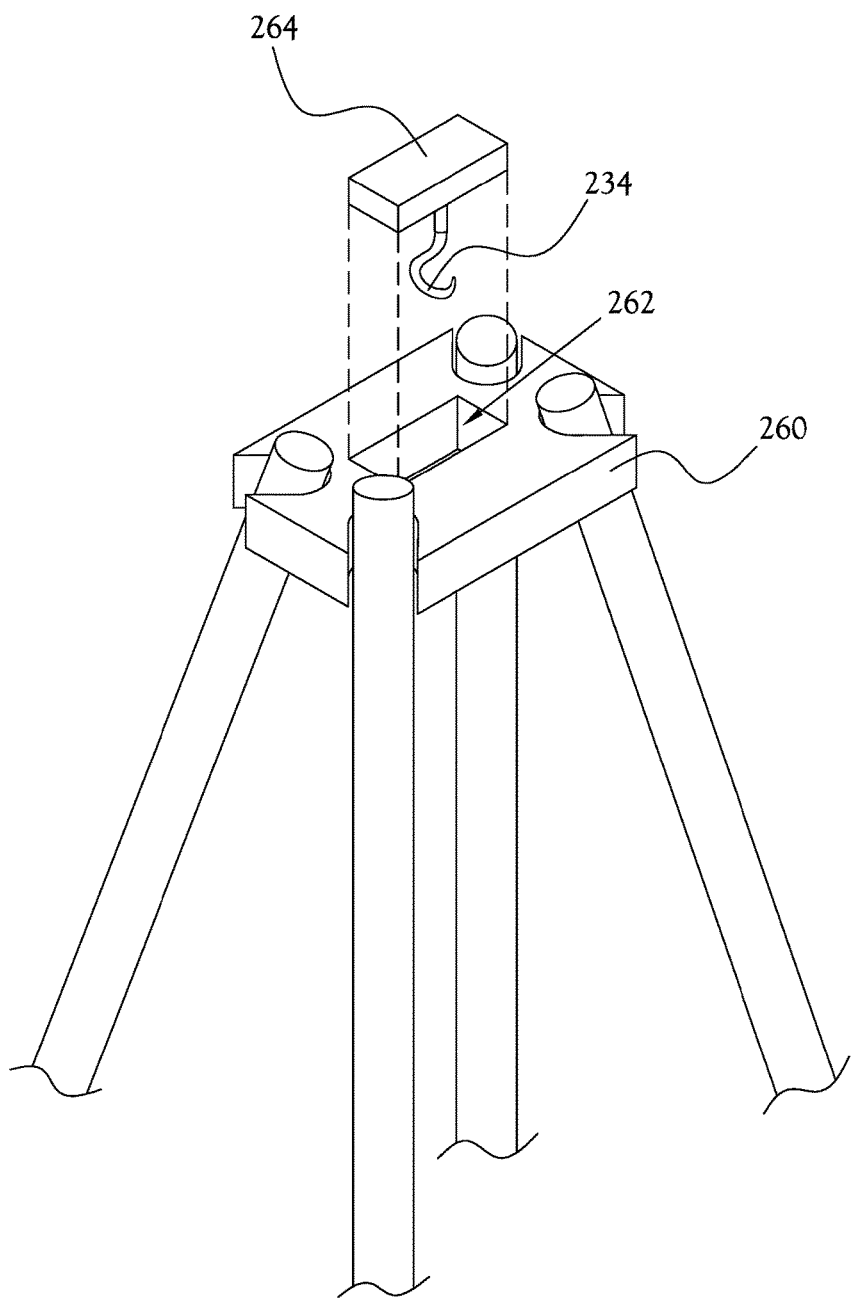
FIGS. 4A and 4B represent a second perspective view of the example embodiment shown in FIG. 3, showing the stand.
Figure 4B:
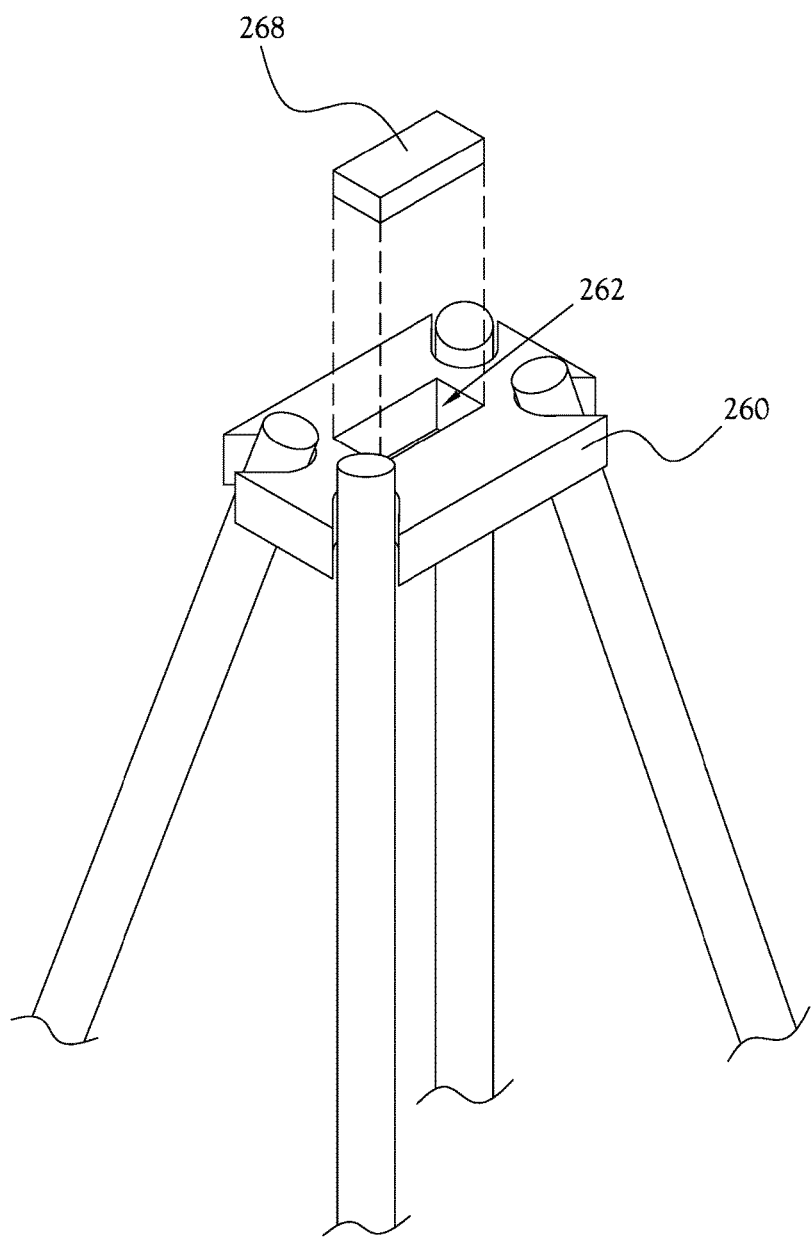
Figure 5:
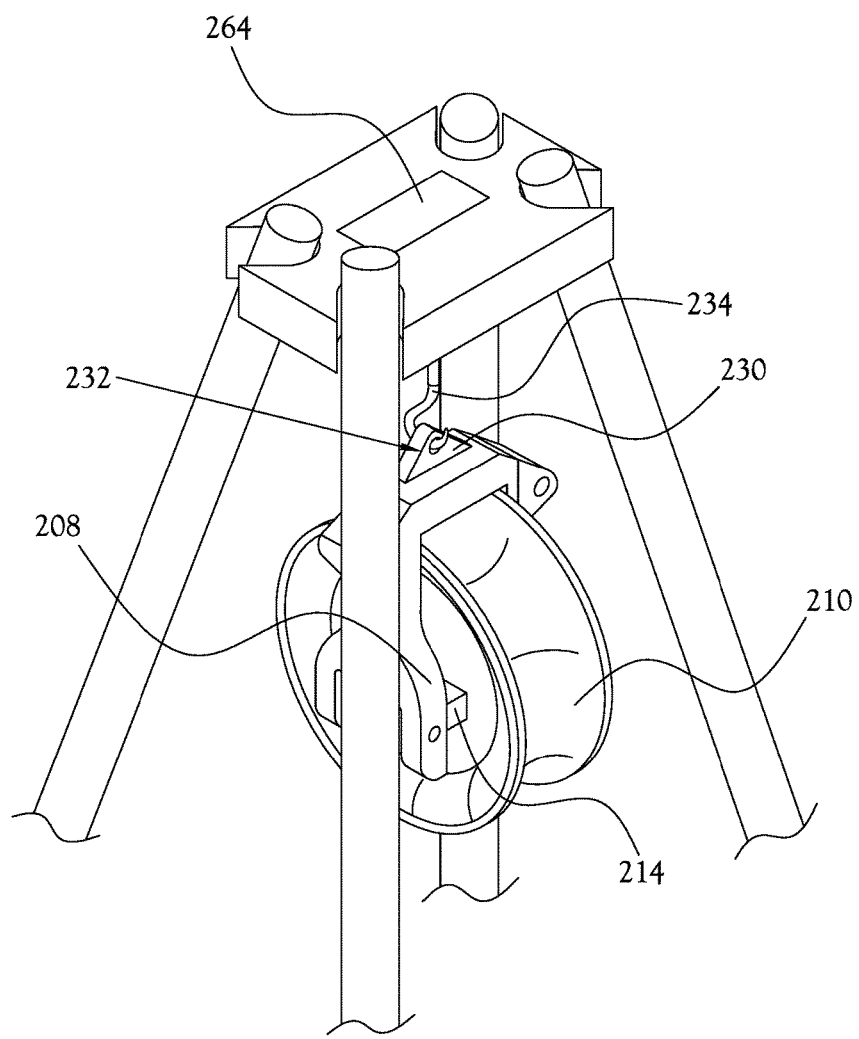
FIG. 5 is a perspective view of the example embodiment shown in FIGS. 3, 4A and 4B, showing the detachable frame and roller positioned below the stand and hanging from a portion of the stand.

FIGS. 3-5 illustrate another example embodiment of a cable support system according to the present general inventive concept. In the illustrated example embodiment, the cable support system 200 includes a roller 210 supported within a Y-shaped frame 208, the roller 210 being connected to the frame 208 through an axle or spindle assembly 214. The frame 208 is configured to work with a stand plate 260, and the stand plate 260 is connected to a plurality of legs 280 that support and elevate the cable support system 200. Generally, the example embodiment cable support system 200 of FIGS. 3-5 is capable of switching between at least two different states, or at least two modes of use or operation: a first mode, in which the roller 210 and frame 208 are positioned above the stand plate 260, as shown in FIG. 3; and a second mode, in which the roller 210 and frame 208 are positioned below the stand plate 260, as shown in FIG. 5. In the first mode, as shown in FIG. 3, the frame 208 is configured to fit within an aperture 262 defined in the stand plate 260. In the second mode, a holding block 264 or similar apparatus is inserted into the aperture 262 in the stand plate 260, as shown in FIG. 4A; the holding block 264 includes a hook 234 or other apparatus for holding. The frame 208 holding in the roller 210 includes a suspension member 230 with a small aperture 232 to receive the hook 234 or other apparatus for holding. In this mode, then, the frame 208 holding in the roller 210 is suspended from (or hanging from) the stand plate 260, as shown in FIG. 5. In this mode or state, the roller 210 is closer to the ground or surface than in the other mode or state, and being closer to the ground or surface facilitates the pay out or taking up of cable through the roller 210 when the cable is being paid out or taken up at a particular angle or, for example, from underground.

In some configurations or modes of use, the stand plate 260 receives a holding block 268 that is unadorned, and is inserted into the aperture 262 in the stand plate 260, as shown in FIG. 4B, in order to facilitate storage of the stand assembly, or for other purposes.

FIGS. 6A-6D illustrate examples of leg ends, including various embodiments of a plain leg end 310, a foot 314, a spike 318, and a locking wheel 322 or other device which interposes between the leg and the ground or other surface. The leg may be stationary or planted or rollable with a wheel. In another example, at least one leg may have a device which permits the leg to move, roll or slide. In another example, at least one leg may have a device which permits the leg to move along the ground in an unlocked state and to remain stationary in a locked state.

In an example embodiment, the cable support facilitates lifting and supporting a cable above a supporting surface to allow cable to be payed out from or onto an externally located reel, and for facilitating movement of a cable to various desired locations at a job site. In an example, the cable support facilitates cable to be payed out across obstacles, such as a fence, stream, wall, etc.

In an example embodiment, the cable support apparatus enables a single individual to elevate a heavy cable to a freely rotatable position, with the apparatus disposed in a first orientation, and which enables a single individual to transport the cable to a position in a second orientation. Another example use is a cable reel transporter which may be readily knocked down, stored and transported by a single individual. Another object of the invention is to provide a cable reel lifter/transporter which may accommodate cable reels having a wide range of widths as well as diameters.

An example embodiment of the cable support system comprises a frame having a first side, a second side, a top and a bottom; an axle disposed through the frame extending from the first side to the second side; a drum having a rim for receiving the axle such that the drum is supported by and rotates on the axle, wherein the drum is in rollable contact with the cable for supporting the cable and configured for cable to move across surface of the drum while the drum is rotating to facilitate paying out or taking up the cable as the drum rotates; and a stand having a top portion in contact with the bottom of the frame and a plurality of legs which extend downwardly from the top portion, wherein the legs and top portion elevate the frame to facilitate the pay out or taking up of the cable over objects below the frame.

As described above, in some example embodiments of the present general inventive concept, the drum is supported by the axle, which is disposed through the frame and extends from the first side of the frame to the second side of the frame. The drum and axle are therefore both located within the frame. In some embodiments, the shape of the drum is such that the space between the drum and the first side of the frame and between the drum and the second side of the frame is negligible or, at any rate, much smaller than the diameter of the cable that is in contact with the drum. In some embodiments, the drum tapers in such a way as to be effectively flush with the first side of the frame and with the second side of the frame. This arrangement helps to minimize the possibility of snags or the possibility of the cable becoming caught in a space between the drum and the frame. In some embodiments, the drum has a first part that tapers to be flush with the first side and a first part that tapers to be flush with the second side. In some embodiments, the drum, axle and frame are structurally similar to, for example, the XS-100B Universal Stringing Blocks manufactured by Sherman+Reilly, Inc., of Chattanooga, Tenn. Those of skill in the art will recognize other variations that fall within the scope of the present general inventive concept.

Some example embodiments further comprise a rotation system configured to facilitate the frame to rotate about an axis approximately perpendicular to the axis of rotation of the drum. An example further comprises a rotation system comprised of a pin and hole system. An example further comprises a tilt system configured to facilitate tilting of the frame to change the axis of rotation of the drum. An example further comprises a tilt system comprising a ball and socket system. An example further comprises a rotation system configured to facilitate the frame to rotate about three axes. An example further comprises a rotation system comprising a ball and socket system.

While the present general inventive concept has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The present general inventive concept in its broader aspects is therefore not limited to the specific details, representative apparatus and methods, and illustrative examples shown and described. Accordingly, departures may be made from such details without departing from the spirit or scope of applicant's general inventive concept.

Still other embodiments will become readily apparent to those skilled in this art from reading the above-recited detailed description in view of all the drawings. It is noted that the simplified diagrams do not illustrate all the various connections and assemblies of the various components, however, those skilled in the art will understand how to implement such connections and assemblies, based on the illustrated components, figures, and descriptions provided herein.

It is also noted that numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Accordingly, while the present general inventive concept has been illustrated by description of several embodiments, it is not the intention of the applicant to restrict or in any way limit the scope of the inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings.

While embodiments are described herein, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for manipulating cable comprising:
   a frame having a first side and a second side;
   an axle disposed through the frame extending from the first side to the second side;
   a roller having a rim for receiving the axle such that the roller is supported by and rotates on the axle, wherein the roller is in rollable contact with the cable for supporting the cable and configured for cable to move across surface of the roller while the roller is rotating to facilitate movement of the cable as the roller rotates; and
   a stand having a stand plate in physical communication with the frame and a plurality of legs which extend downwardly from the stand plate, wherein the legs and stand plate elevate the frame to facilitate the movement of the cable over objects below the frame;
   wherein the frame is configured to rest atop said stand plate in a first state and is also configured to suspend from said stand plate in a second state.

2. An apparatus in accordance with claim 1, further comprising a suspension assembly attached to said stand plate to suspend said frame from said stand plate.

3. An apparatus in accordance with claim 2, wherein said suspension assembly includes a hook.

4. An apparatus in accordance with claim 1, further comprising a rotation system configured to facilitate the frame to rotate about an axis approximately perpendicular to the axis of rotation of the roller.

5. An apparatus in accordance with claim 4, wherein the rotation system comprises a pin and hole system.

6. The apparatus according to claim 1, wherein said plurality of legs includes at least three legs.

7. The apparatus according to claim 1, wherein said plurality of legs includes four legs.

8. A cable support system comprising:
   a frame having a first side and a second side;
   an axle disposed through the frame extending from the first side to the second side;
   a drum having a rim for receiving the axle such that the drum is supported by and rotates on the axle, said drum being in rollable contact with the cable to support the cable, said drum being configured for cable to move across surface of the drum while the drum is rotating to facilitate paying out or taking up the cable as the drum rotates; and
   a stand having a top portion proximate said frame and a plurality of legs which extend downwardly from the top portion, wherein the legs and top portion elevate the frame to facilitate the pay out or taking up of the cable over objects below the frame;
   wherein the frame is configured to be above said top portion in a first mode and is also configured to be below said top portion in a second mode.

9. The cable support system according to claim 8, further comprising a suspension assembly attached to said top portion to suspend said frame from said top portion when said frame is below said top portion in a second mode.

10. The cable support system according to claim 9, wherein said suspension assembly includes a hook.

11. The cable support system according to claim 8, further comprising a rotation system configured to facilitate the frame to rotate about an axis approximately perpendicular to the axis of rotation of the roller.

12. The cable support system according to claim 11, wherein the rotation system comprises a pin and hole system.

13. The cable support system according to claim 8, further comprising a tilt system configured to facilitate tilting of the frame to change the axis of rotation of the drum.

14. The cable support system according to claim 13, wherein the tilt system comprises a ball and socket system.

15. The cable support system according to claim 8, further comprising a rotation system configured to facilitate the frame to rotate about three axes.

16. The cable support system according to claim 15, wherein the rotation system comprises a ball and socket system.

17. The cable support system according to claim 8, wherein said drum has a first part that tapers to be flush with the first side and a second part that tapers to be flush with the second side.

18. The cable support system according to claim 8, wherein said plurality of legs includes at least three legs.

19. The cable support system according to claim 8, wherein said plurality of legs includes four legs.

* * * * *